Nov. 11, 1958  H. W. BERRY  2,859,567
FETTLING MACHINES

Filed June 20, 1957  3 Sheets-Sheet 1

INVENTOR
HARRY W. BERRY
BY

Nov. 11, 1958  H. W. BERRY  2,859,567
FETTLING MACHINES

Filed June 20, 1957  3 Sheets-Sheet 2

INVENTOR
HARRY W. BERRY

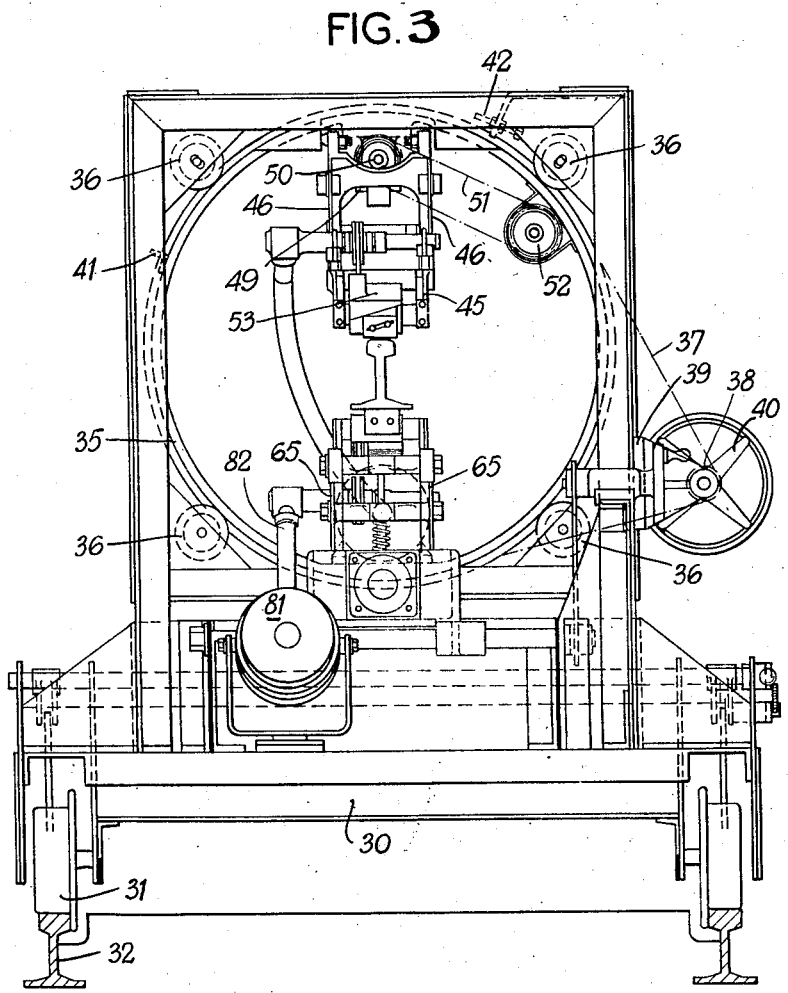

United States Patent Office 2,859,567
Patented Nov. 11, 1958

2,859,567

FETTLING MACHINES

Harry Wear Berry, Wokingham, England, assignor to Flextol Engineering Company Limited, London, England Application June 20, 1957, Serial No. 666,972

Claims priority, application Great Britain June 20, 1956

6 Claims. (Cl. 51—178)

This invention relates to fettling machines, primarily intended for the accurate trimming to contour of welded joints in profiled rails, such as railway rails.

There are advantages in using railroad tracks in which the rails are in a continuous length extending for distances up to a mile or more. Such rails can be formed by welding together a number (say six) of shorter rails of say 60 ft. length in the shop, laying these long rails and then welding the long rails together in situ as required. It is necessary that the welds between the 60 foot lengths should be accurately trimmed after welding so that the profile at the welded joint is within close limits the same as the profile of the rail section.

It is an object of the present invention to provide machines by which such accurate fettling of welded rails may be achieved, though it will be understood that the invention is not restricted to its application for such purposes and could be used for bars, joists, tubes and extruded or rolled sections.

Another object of the present invention is to provide a machine in which the profile of the rail (or equivalent welded article) is used as a template to determine the shape of the welded joint after trimming with a cutting tool such as a grinding wheel, milling tool or the like.

Preferably two guide members are provided, contacting the rail at opposite sides of the welded joint.

In a machine according to the invention for trimming the side and top surfaces of a profiled rail, the cutting tool is supported from an annular ring rotatable about the rail so as to feed the cutting tool around the welded joint. For trimming a flat surface such as the underside of a rail, a cutting tool may be mounted on a carriage reciprocable across the rail to feed the cutting tool along the welded joint. These two cutting tools may be combined into a single unit so that the side and top surfaces and the flat under surface of a profiled rail may be trimmed by the same machine.

Figure 1:
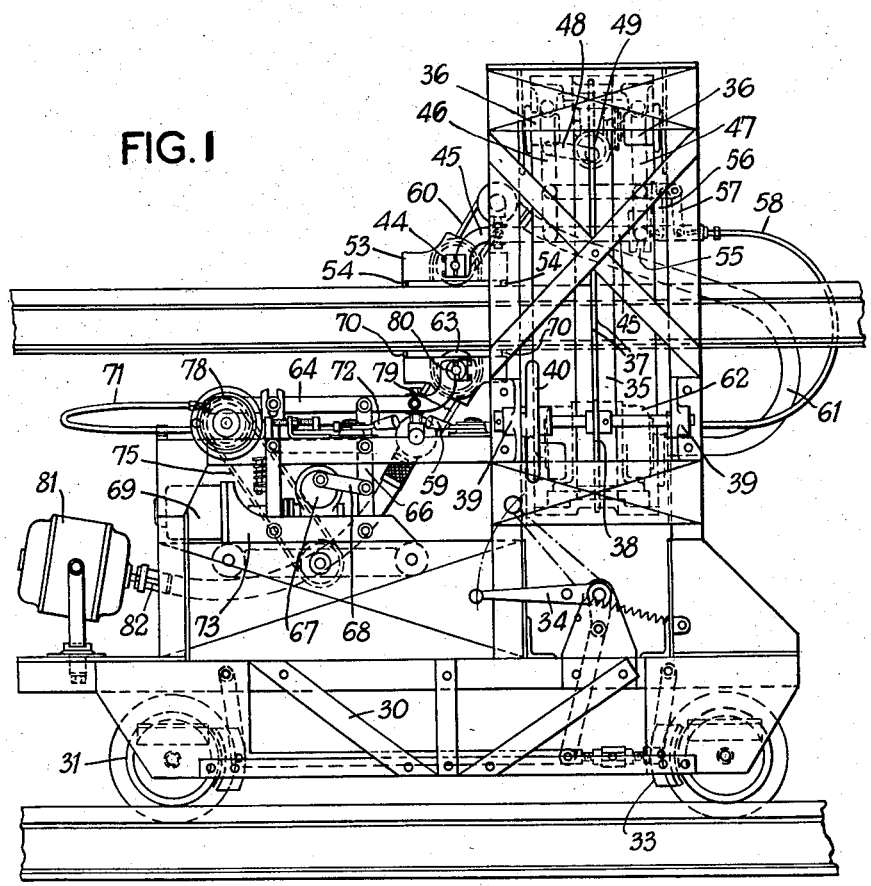
Figure 2:
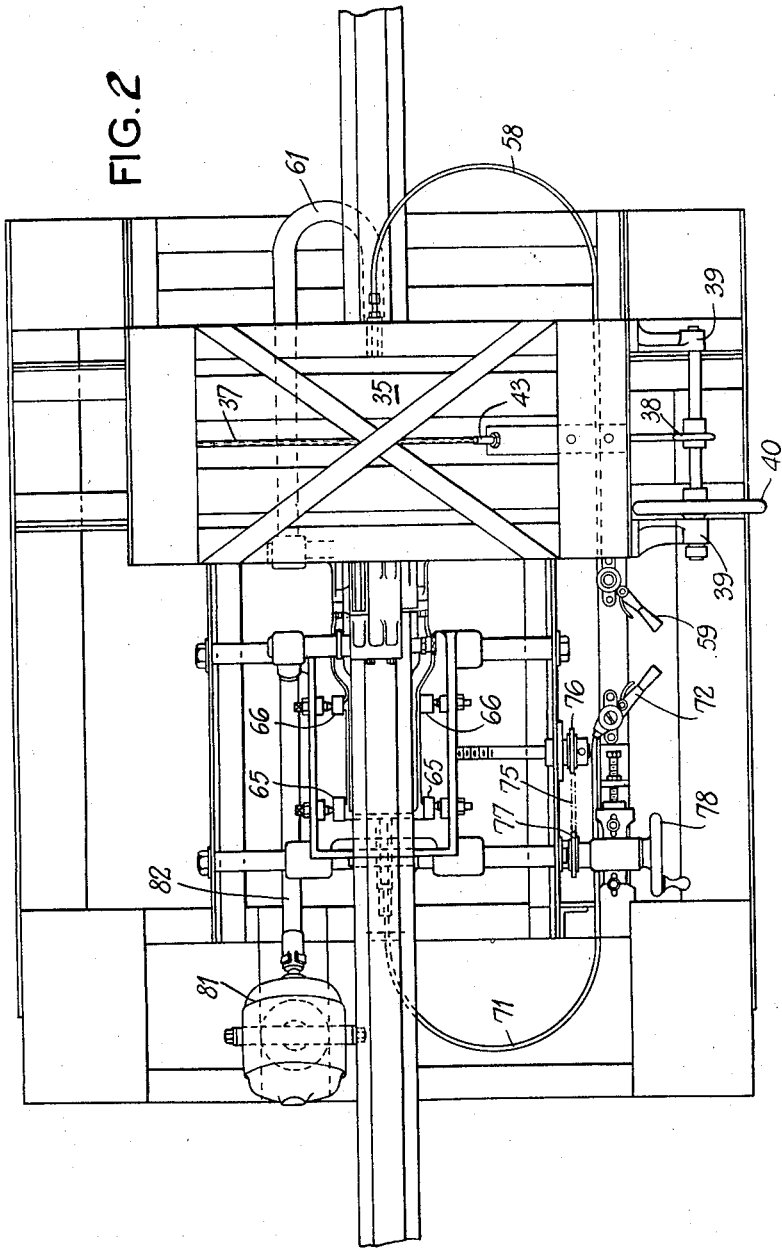

Other parts of the invention are embodied in the preferred form which will now be described in some detail by way of example with reference to the accompanying drawings in which:

Fig. 1 is a side view,
Fig. 2 is a plan view,
Fig. 3 is an end view.

The machine shown in the drawings is intended for use in the shop in the fabrication of long continuous lengths of rail by the successive steps of welding rails in end-to-end relation, removing excess weld metal from the welded joint by a stripping machine which leaves a thin layer of excess weld metal (say about 1/32 in. thick) and finally trimming this thin layer in a machine of the present invention to secure a finished welded joint of profile identical within close limits with the original profile of the rail.

The machine shown comprises two units, one unit being adapted for the fettling of the side and top surfaces of a profiled rail and the other being adapted for fettling the under-surface of the rail. It will be understood that if preferred each unit could be a separate machine.

In the drawings, a frame 30 is mounted on wheels 31 running on tracks 32 so that the machine may be positioned adjustably in relation to the stripping machine. Means may be provided for locking the machine in adjusted position, such for example as brakes 33 operated by a hand lever 34.

An annular ring 35 is mounted in this frame being supported and guided by rollers 36 arranged at the corners of a square. A chain 37 is fixed at one end to the ring 35, passes around the outside of the ring, around a rotatable sprocket 38 journalled in brackets 39 on the machine, again around the ring and secured at its other end to the ring. The sprocket 38 is rotated by a hand wheel 40 and rotates the annular ring through an angle determined by contact of a projection 41 on the ring against adjustable stops such as the stop 42 on the frame. The chain 37 may be connected to the ring at one end by a threaded screw 43 which may be rotated to tension the chain.

A grinding wheel or milling cutter or similar metal-cutting tool 44 is mounted on a bar 45 suspended by parallel links 46, 47 from the inside circumference of the annular ring 35 these links being pivoted to the bar at one end and to the ring at their other end. The axis of the bar 45 is parallel to the axis of the annular ring.

The bar 45 and so the cutter 44 is reciprocated parallel to the axis of the annular ring by crank and connecting rod mechanism. The connecting rod 48 is rotatably connected at one end to one link 46 and at the other end to the crank 49 which is rotated through a geared drive 50 and chain 51 from an electric motor 52 mounted on the inside of the annular ring.

Pivotally mounted on one end of the bar 45 is a box type guard 53 containing the cutter or grinding wheel spindle centrally mounted between adjustable guides 54 with hard steel rubbing faces which are set on a common tangent with the periphery of the cutter or grinding wheel. The end of the bar with the assembly described above is pressed in contact with the surface of the rail to be fettled by a spring or by other suitable means.

In order that the cutter may be raised clear of the rail, the pivotal connection of the bar 45 to the link 47 remote from the cutter is in an open slot 55. A thrust member 56 is pivoted to the bar 45 adjacent this pivotal connection and is engaged at its upper end by an arm of a bell-crank lever 57 pivoted to the cross-bar. The other arm of this lever is connected by Bowden wire mechanism 58 to a hand lever 59 so that the thrust member may be pushed down to turn the bar about the pivot nearest the cutter and so lift the cutter.

The cutter is driven by a chain or belt drive 60 from a shaft which in turn is driven through flexible shafting 61 from a motor 62 fixed to the frame of the machine.

The operation of this part of the machine should now be clear. The rails, having been welded and the welded joint stripped of weld metal so as to leave only a thin layer, are positioned in the machine so that the welded joint lies between the two guides 54 which are in contact with the unwelded portions on either side of the joint. The cutter 44 is reciprocated across the joint whilst the annular ring 35 is rotated around the rails. Rotation of the ring feeds the cutter around the profile. The guides are maintained always in contact with the unwelded portions of the rail so that the cutter follow the profile of the rail and trims the welded joint to the exact shape (within very narrow limits) of the unwelded portions of the rail on each side and across the top of the head.

The rest of the machine shown in the drawings is used for trimming the flat underside of the rail. A cutter 63 is supported on a bar 64 supported on links 65, 66 from a carriage 73 of the machine and reciprocated by a crank 67, connecting rod 68 and motor 69 in a similar manner to that described in relation to cutter 44. On either side of the cutter 63 are guide pins 70 which bear against the underside of the rail. The cutter can be moved clear of the rail as described in relation to cutter 44 by a thrust member operated through Bowden cable 71 by a hand lever 72.

The carriage 73 and so the cutter 63 is traversed along the weld by a screw 74 rotated by a chain drive 75 and sprockets 76, 77 operated by a hand wheel 78.

The cutter 63 is rotated by a chain or belt 79 from a shaft 80 which in turn is rotated by a flexible shaft 82 from a motor 81 mounted on the frame of the machine.

Instead of rotating the ring 35 and traversing the carriage 73 by manual operation of handwheels 40 and 78, these may be provided with means for power operation. An electric motor drives a shaft to which the shaft of sprocket 38 and the transverse screw 74 may be connected by clutches operated by hand levers. By clutching in the appropriate drive, either the ring 35 may be rotated by the electric motor or the carriage 73 traversed by the motor or both.

It will be understood that the invention is not restricted to the details of the preferred forms described by way of example which may be modified without departure from the broad ideas underlying them.

I claim:

1. A fettling tool comprising a frame, an annular ring rotatable within said frame, a cutting tool mounted within said annular ring, means for mounting a welded profiled rail within the annular ring, means for pressing the cutting tool towards the rail, means for rotating the annular ring to traverse the cutting tool around the weld in the rail and guide means associated with the cutting tool contacting the rail remote from the weld.

2. A fettling tool comprising a frame, an annular ring rotatable within said frame, a cutting tool mounted within said annular ring, means for mounting a welded profiled rail within the annular ring, means for pressing the cutting tool towards the rail, means for rotating the annular ring to traverse the cutting tool around the weld in the rail and two guide members associated with the cutting tool and contacting the rail, on each side of the weld.

3. A fettling tool comprising a frame, an annular ring rotatable within said frame, a bar, parallel links supporting said bar from said annular ring, a cutting tool mounted on said bar within said annular ring, means for mounting a welded profiled rail within the annular ring, means for pressing the cutting tool towards the rail, means for rotating the annular ring to traverse the cutting tool around the weld in the rail and guide means associated with the cutting tool contacting the rail remote from the weld.

4. A fettling tool comprising a frame, an annular ring rotatable within said frame, a bar, parallel links supporting said bar from said annular ring, means to pivot said bar on one of said links, a cutting tool mounted on said bar within said annular ring, means for mounting a welded profiled rail within the annular ring, means for pressing the cutting tool towards the rail, means for rotating the annular ring to traverse the cutting tool around the weld in the rail and guide means associated with the cutting tool contacting the rail remote from the weld.

5. A fettling tool comprising a frame, an annular ring rotatable within said frame, a cutting tool mounted within said annular ring, means for mounting a welded profiled rail within the annular ring, means for pressing the cutting tool towards the rail, means for rotating the annular ring to traverse the cutting tool around the weld in the rail and guide means associated with the cutting tool contacting the rail remote from the weld; a carriage reciprocable along the length of said rail, a second cutting tool mounted on said carriage, means for pressing the second cutting tool towards the underside of said rail, means for reciprocating said carriage to traverse the second cutting tool across the weld in the rail, and guide means associated with said second cutting tool contacting the underside of said rail remote from the weld.

6. A fettling tool comprising a frame, an annular ring rotatable within said frame, a cutting tool mounted within said annular ring, means for mounting a welded profiled rail within the annular ring, means for pressing the cutting tool towards the rail, means for rotating the annular ring to traverse the cutting tool around the weld in the rail and guide means associated with the cutting tool contacting the rail remote from the weld, a carriage reciprocable along the length of said rail, a second cutting tool mounted on said carriage, means for pressing the second cutting tool towards the underside of said rail, means for reciprocating said carriage to traverse the second cutting tool across the weld in the rail, and two guide members associating with said second cutting tool contacting the underside of said rail on each side of the weld.

References Cited in the file of this patent

UNITED STATES PATENTS

| 1,562,558 | Hobson | Nov. 24, 1925 |

FOREIGN PATENTS

| 905,984 | Germany | Mar. 8, 1954 |
| 610,866 | Germany | Mar. 18, 1935 |